United States Patent [19]
Braun et al.

[11] 3,861,222
[45] Jan. 21, 1975

[54] COUNTERBALANCED FIXED STROKE COMPRESSORS

[75] Inventors: Anton Braun, 6421 Warren Ave., Minneapolis, Minn. 55435; Oswald Thun, Recklinghausen, Germany

[73] Assignee: said Braun, by said Thun

[22] Filed: Apr. 30, 1973

[21] Appl. No.: 355,705

[52] U.S. Cl. .................................................. 74/44
[51] Int. Cl. ........................................... F16h 21/22
[58] Field of Search ............... 308/3 CH; 74/44, 29; 123/56 AC

[56] References Cited
UNITED STATES PATENTS

| | | | |
|---|---|---|---|
| 1,433,649 | 10/1922 | Powell | 74/44 |
| 2,156,010 | 4/1939 | Connor | 123/56 AC |
| 2,171,554 | 9/1939 | Hedges | 308/3 CH |
| 2,328,918 | 9/1943 | McManus | 308/3 CH |
| 2,510,377 | 6/1950 | Carr | 74/44 |

FOREIGN PATENTS OR APPLICATIONS

| | | | |
|---|---|---|---|
| 417,470 | 8/1925 | Germany | 74/44 |

*Primary Examiner*—Wesley S. Ratliff, Jr.
*Attorney, Agent, or Firm*—Dorsey, Marquart, Windhorst, West & Halladay

[57] ABSTRACT

Counterbalanced fixed stroke compressors are shown in which first and second movable slider and counterbalancer members are interconnected by specified interconnecting mechanism for straight-line, reciprocating movement in opposite directions from each other along a common longitudinal axis at all times. The machines include a counterbalanced single-throw crankshaft member having a crank portion and a counterbalancing portion. A connecting rod has one end pivoted to the crank portion and the other end connected to the slider member for transmission of desired forces from the rotary crankshaft to the reciprocating slider member. The machines include one or more compressor piston portions associated with and moving longitudinally as a unit as at least one part of one or both of the slider and counterbalancer members, with at least one piston portion and an associated compressor cylinder wall portion positioned along the longitudinal axis beyond the crankshaft member and interconnecting mechanism.

In a preferred embodiment, the longitudinal axis of the machine is vertical, the compressor chamber and piston portions are at the top of the compressor and at least one piston portion is associated with the counterbalancer member and is driven indirectly from the crankshaft through the connecting rod, slider member, and interconnecting mechanism. A variety of design possibilities are disclosed, in some of which at least one compression chamber can be effectively isolated from those compressor elements which require lubrication, such as the crankshaft, connecting rod, slider member and interconnecting mechanism, and in all of which the novel counterbalancing arrangement permits higher speed operation with reduced total size, weight and cost for a given application.

20 Claims, 6 Drawing Figures

PATENTED JAN 21 1975  3,861,222
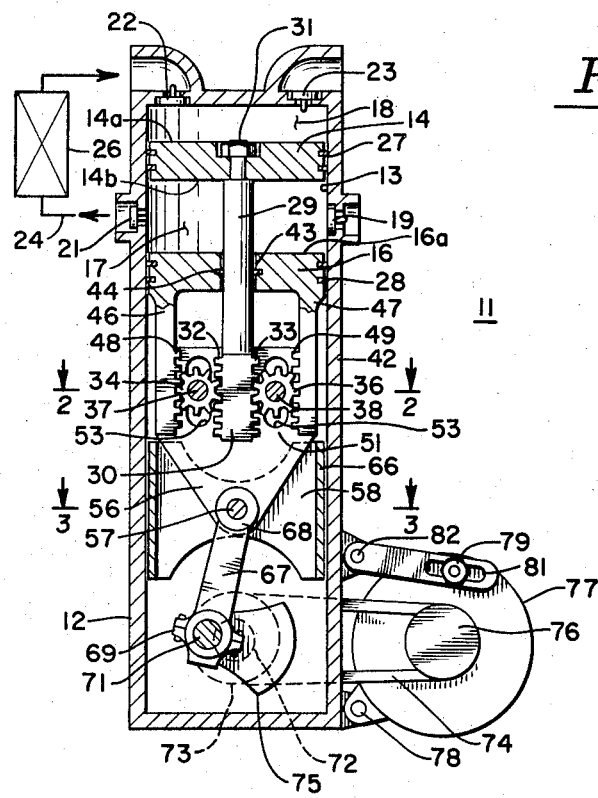
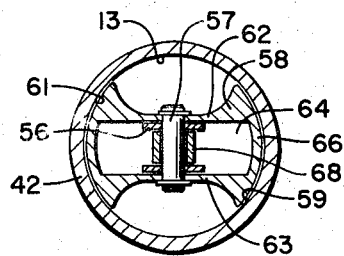
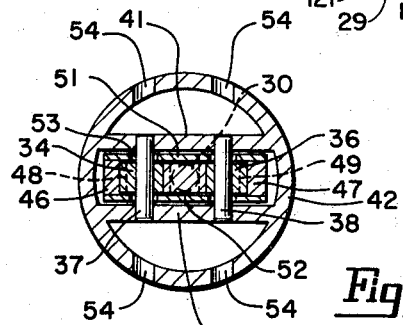
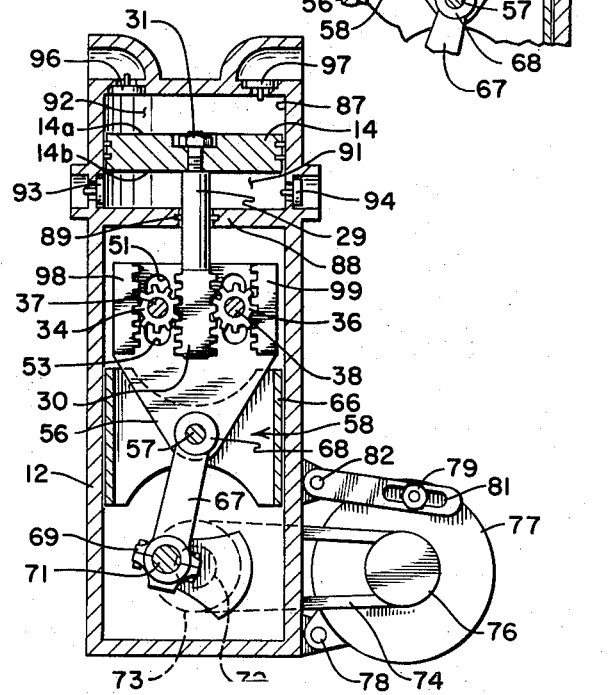

COUNTERBALANCED FIXED STROKE COMPRESSORS

BACKGROUND OF THE INVENTION

Various fixed stroke compressors are known in the prior art in which a crankshaft is connected by one or more connecting rods to one or more reciprocating piston members, in order to transmit or convert rotary motion from the crankshaft to reciprocating motion of such piston members.

In one well-known type of compressor, a crankshaft at the base of the machine is connected by a connecting rod to a piston operating in a compressor chamber at the top of the machine. Where the connecting rod is directly connected to such a piston, it is difficult to isolate the compressor chamber effectively from the lubricant ordinarily required for the crankshaft and connecting rod connections.

Moreover, where large compressor capacities are required, the vertical reciprocation of a large compressor piston and the rotary movement of the crankshaft and associated connecting rod portion generate substantial reciprocating and rotary forces which can cause substantial vibrations. Some of these machines have accordingly been provided with relatively broad and heavy bases, which increase their size and cost without effectively eliminating the transmission of undesired forces to the supporting building floor or foundation, and without the opportunity for efficient, high speed operation.

Various arrangements have been proposed for counterbalancing different types of machines to varying degrees. In some cases, the desired degree of balance has been sought by the provision of plural-throw crankshafts, with a number of crank portions arranged at different angles around the crankshaft axis. In other cases a single crank or different crank portions have been joined by appropriate connecting rods to a plurality of different reciprocating pistons which may move on two or more different axes extending at different angles from the crankshaft axis.

In the particular class of fixed stroke piston machines which involve single throw crankshafts, attempts have been made to provide the necessary balance by appropriate counterbalancing portions at different points on a crankshaft, so that the crankshaft counterweights will partly balance both the rotary moving masses of the crank itself and the longitudinally reciprocating masses of the connected reciprocating member or piston.

A discussion of the prior art constructions and problems and one example of an effort to achieve balance in a single-throw crankshaft engine are shown, for example, in U.S. Pat. No. 3,415,237 of J. R. Harkness. As discussed therein, efforts to balance piston reciprocation by providing a crankshaft with a counterbalancing weight portion, disposed 180° opposite the crank portion to which one end of the piston connecting rod is attached, would require sufficient counterbalancing weight or mass to substantially overbalance the crank itself and the attached end of the connecting rod. Hence, there is a resulting centrifugal force vector diametrically opposite the crank. Thus, Harkness points out that it has not been practical to achieve substantially complete counterbalancing of both the reciprocating piston and of the rotary crank portion, and that engines or devices of this single-throw type have been counterbalanced just enough to achieve a limited condition of overbalance from a rotary standpoint, and incomplete balancing of the reciprocating forces. Harkness proposed to solve this problem by using two contra-rotating counterbalances which are so arranged that they reduce the centrifugal forces which would otherwise be added by the rotation of such masses and in effect provide a 100% overbalance of the reciprocating piston parts.

The solution proposed by Harkness, however, does add substantial additional rotary masses and requires additional gearing and parts in connection with the crankshaft construction. Moreover, the Harkness proposal involves the addition of a balancing mechanism to a crankshaft, without in any way modifying the normal direct connection between the crankshaft and the reciprocating piston.

There has been at least one disclosure of an effort to counterbalance heavy reciprocating parts in other types of crankshaft driven machines, such as crank and punch presses or embossing machines, by the use of a separate counterbalancing unit, in which a crankshaft drives a reciprocating member through a connecting rod, and the reciprocating member is connected in turn, by individual pivotally mounted levers, to each of a pair of spaced apart counterweights which are located at opposite sides of the reciprocating member. In that case, the arrangement of counterweights and their drive is said to be completely isolated from the main crank assembly of the main machine which has the heavy reciprocating parts to be counterbalanced. Such disclosure does not show the manner in which the separate counterbalancing unit is to be connected to such a main machine or what the total combination of elements would be. It seems clear, however, that such a proposal involves the addition or connection of something to a main machine or its crankshaft without any suggestion for modification of whatever direct connection the machine normally includes between its main crank assembly and its heavy reciprocating press or embossing machine parts, and without any suggestion for modifying or adding to the reciprocating machine parts which are driven by such a main crank assembly.

In the field of variable-stroke piston machines, such as free piston engines, various synchronizing and balancing devices have also been used, as shown, for example, in U.S. Pat. Nos. 3,501,088, 3,524,436 and 3,525,102 of Anton Braun. Such free-piston engines, however, do not involve rotary crankshafts which rotate through successive complete revolutions of 360° in the same direction, as is the case in fixed-stroke machines. Thus, such variable-stroke machines have been considered as a separate class with its own special problems to solve. One does not normally look to that class for solutions to the special problems of another class, nor would one find in said Braun patents any teaching as to how and where a synchronizing apparatus as disclosed therein for variable-stroke free piston engines might be combined in a fixed stroke compressor, or how the construction and arrangement of parts in such a compressor might be modified to minimize vibration and effectively isolate a compressor chamber from lubricants or other contaminants normally present in connection with the compressor driving mechanism.

SUMMARY OF THE INVENTION

The present invention provides an improved counterbalanced fixed stroke compressor having a first movable member serving as a slider member, guide means supporting the slider member for straight-line reciprocating movement with its center of gravity moving along a desired longitudinal axis, a second movable member serving as a counterbalancer member also supported for straight-line reciprocating movement with its center of gravity moving along the same longitudinal axis, interconnecting mechanism connecting the slider and counterbalancer members for counterbalancing straight-line movements of such members in opposite directions to each other along said axis at all times, a counterbalanced single-throw rotary crankshaft member extending generally crosswise with reference to said longitudinal axis and having a single-throw crank portion and a counterbalancing portion thereon, a connecting rod having one end pivotally connected to said crank portion and a second end pivotally connected to the slider member for transmission of desired forces from the rotary crankshaft member to the slider member, and at least a first piston portion with at least one piston face associated with and reciprocating longitudinally along said axis as a unit as at least part of one of the slider and counterbalancer members. This first piston portion is positioned along the longitudinal axis at a location beyond the crankshaft member and interconnecting mechanism, and a compressor cylinder has at least a first cylinder wall portion positioned along the longitudinal axis beyond the crankshaft member and interconnecting mechanism, with the first piston portion reciprocating within said first cylinder wall portion and with said one piston face serving as a movable compressor piston face providing one movable end wall of at least a first compression chamber within the cylinder.

The interconnecting mechanism between the first and second movable slider and counterbalancer members insures straight-line reciprocating movement of these members in opposite directions along the longitudinal axis at all times and along proportional distances. Where the total masses moving in opposite directions are equal, their oppositely directed movements should be on a 1-to-1 basis, i.e., with equal straight-line movements along the same axis in opposite directions at all times. Where the masses are not equal, the relative distances of movement should be proportional, so that the absolute value of the product of the total mass moving in one direction times the distance of its movement is equal to the absolute value of the product of the total mass moving in the other direction times its distance of movement. The interconnecting mechanism itself should have a construction which provides the desired straight-line movements of the slider and counterbalancer members in opposite directions, without introducing lateral or swinging components of movement which could contribute undesired vibrations, and which are not balanced within the mechanism itself.

Specific interconnecting mechanisms are shown in which at least two oscillating, rotary interconnecting members are supported for rotation on supporting axes extending crosswise of the longitudinal axis and spaced symmetrically from each other around and outwardly from that longitudinal axis. These rotary interconnecting members have inner and outer portions, and the mechanism includes symmetrically arranged outer connecting members providing a force transmitting connection between the outer portion of each rotary interconnecting member and one of the movable slider and counterbalancer members, in combination with symmetrically arranged inner connecting members which provide a force transmitting connection between the inner portion of each rotary interconnecting member and the other of said slider and counterbalancer members. Where levers are used as the first and second rotary interconnecting members, the outer connecting members are in the form of links pivoted to the outer ends of the levers and extending generally longitudinally in one direction to one of the first and second movable members, while the inner connecting members are in the form of links pivoted to the inner ends of the levers and extending generally longitudinally in the opposite direction to the other of the first and second movable members. The inner and outer oppositely extending connecting links should be parallel to each other, and their relative lengths should be proportional to the corresponding distances between the pivotal axis of each oscillating rotary interconnecting member or lever and the corresponding inner and outer points at which such links are pivoted to the respective inner and outer portions of such levers on pivotal axes parallel to the pivotal axis of the lever. Thus where the inner and outer distances or lever arm lengths are equal, the inner and outer connecting links are equal to each other in length. If the inner lever arms are half the length of the outer lever arms, the inner links would be half the length of the outer links. The axes of the pivotal link connections to a given lever are parallel to each other and to the pivotal supporting axis of rotation of the lever.

In another specific form, the interconnecting mechanism includes at least two gear members supported for rotation on the crosswise supporting axes, and the outer and inner connecting members are in the form of outer and inner pairs of racks which engage the gear members and are connected to the respective slider and counterbalancer members.

The combination and location of such a slider member, counterbalancer member and interconnecting mechanism with a single-throw counterbalanced crankshaft and a connecting rod pivoted to both the crank and the slider member provides an improved counterbalanced fixed stroke piston machine. For optimum balancing, the mass of the counterbalancing member, including all portions moving longitudinally as a unit therewith, exceeds the mass of the first movable member, including all portions other than the connecting rod moving longitudinally as a unit therewith, by an amount equal to only a portion of the total connecting rod mass, and the effective mass of the counterbalancing portion of the crankshaft exceeds the mass required to counterbalance only the single-throw crank portion by an amount equal to only a portion of the mass required to balance the total connecting rod mass.

In one preferred form of the invention, one or more piston portions, constituting all the compressor piston portions of the machine, move as a unit with only one of the movable slider and counterbalancer members, and no piston portion moves with the other of said movable members. In one example of this preferred form, all compressor piston portions move longitudinally as a unit with only the movable counterbalancer member. In some embodiments of the invention, a compressor piston portion moves as a unit with the movable slider member. In still other preferred embodiments, at least one piston member moves as a unit with each of the slider and counterbalancer members. Thus a piston portion having at least one piston face can move longitudinally as a unit as at least part of one or both of the slider and counterbalancer members or assemblies. Such a piston portion may even serve as substantially an entire slider or counterbalancer member.

In another preferred embodiment, the longitudinal axis of the machine is vertical, and the compressor chamber and piston portions are at the top of the compressor, where at least one piston portion and its associated compression chamber can be effectively isolated, for example, by a compressor cylinder end wall or an intervening open space, from those compressor elements which require lubrication, such as the crankshaft, connecting rod, interconnecting mechanism and related elements.

In the specific embodiments shown, the machine is a two-chamber compressor in which two cylinder wall portions and two piston portions provide two compression chambers along the same longitudinal axis at a location beyond or above the crankshaft member and interconnecting mechanism. Moreover, the relative axial locations of the respective cylinder wall and piston portions, and the particular movable member with which each piston face moves as a unit, provide a compression stroke in one chamber during movement of the connecting rod generally longitudinally in one direction, and a compression stroke in the other chamber during movement of the connecting rod generally in the opposite direction.

Thus the invention provides substantial design freedom in the selection of different relative locations and arrangements for the respective parts. Moreover, the effective balancing of both longitudinal reciprocating forces and the centrifugal forces generated by rotation of the crankshaft portion and the associated end of the connecting rod, make it possible for compressors according to the present invention to operate at effectively higher speeds and with less weight and size than those devices previously known in the fixed stroke compressor field.

Other features, variations and embodiments of the invention will be apparent from the following detailed description.

BRIEF DESCRIPTION OF THE DRAWING

In the drawings which form a part of this application, and in which like reference characters indicate like parts:

FIG. 1 is a partially schematic view, with certain parts shown in section, of an improved counterbalanced fixed stroke, multi-chamber compressor and driving mechanism according to the invention, with one form of interconnecting mechanism between the slider and counterbalancer members;

FIG. 2 is a sectional view on the line 2—2 of FIG. 1;

FIG. 3 is a sectional view on the line 3—3 of FIG. 1;

FIG. 4 is a view similar to FIG. 1 of another form of counterbalanced, multi-chamber compressor assembly, according to the invention;

FIG. 5 is a partial schematic view similar to FIG. 1 showing another form of interconnecting mechanism between the slider and counterbalancer members according to the invention; and FIG. 6 is a partial view showing a modification of the compressor of FIG. 4.

DESCRIPTION OF THE PREFERRED EMBODIMENTS

One form of balanced 2-chamber compressor assembly and driving mechanism is shown generally at 11 in FIG. 1. This compressor has a main housing or supporting frame 12, which includes a compressor cylinder 13 in which a piston 14 moves longitudinally along a vertical axis, as viewed in FIG. 1, and divides the compressor cylinder 13 into a lower first-stage compression chamber 17 and an upper second-stage compression chamber 18. Thus piston 14 includes upper and lower working faces $14a$ and $14b$ respectively. The first-stage compression chamber 17 has an inlet valve 19 and an outlet valve 21, while the second-stage compressor chamber 18 has an inlet 22 and an outlet 23. Outlet 21 of the first-stage is connected as shown schematically at 24 through a suitable intercooler 26 to the inlet 22 of the second-stage chamber 18.

As shown in FIG. 1, the upper end of the upper compression chamber 18 is defined by a compression cylinder head which carries inlet 22 and outlet 23. The lower end of the lower compression chamber 17 is defined in this case by a second movable piston member 16 which has an upper working face $16a$ adapted to move toward and away from, and at all times in the opposite direction of movement from, the working face $14b$ of piston 14, which defines the upper end of chamber 17. Piston 14 is provided with suitable sealing rings 27, while similar rings 28 are provided on piston 16 to provide the desired pressure seals for the compressor chambers.

The balancing and driving mechanism for the compressor assembly 11 includes a piston rod 29 rigidly secured at 31 to upper piston 14. Piston rod 29 has a rack 30 at its lower end, which is specifically illustrated as an inner rack portion having two oppositely and outwardly directed inner racks 32 and 33, which respectively engage the teeth of two laterally spaced gear members 34 and 36 rotatably supported on shafts 37 and 38 which are fixed in the frame 12 as shown more specifically in FIG. 2.

Thus, the pinion supporting shafts 37 and 38 are carried in suitable openings in front and rear cross beams 39 and 41 which extend across from one wall of the frame or housing to the other. This frame or housing portion is indicated at 42 in FIG. 2 and may, if desired, be an integral or separate extension of the cylinder section 13.

Piston 16 includes a central opening 43 and an appropriate sealing member 44 through which the piston rod 29 of upper piston 14 may penetrate piston 16 and thereby connect piston 14 to rack 30 at the gear members 34 and 36, which guide the rack for longitudinal movement.

The lower piston 16 includes two downwardly projecting rack support portions 46 and 47 which are spaced inwardly from the cylinder or housing walls 42 and are provided with inwardly projecting outer toothed racks 48 and 49 which engage the outer teeth of the oscillating pinions 34 and 36. These outer racks 48 and 49 are rigidly connected to each other at a location immediately adjacent to gear members 34 and 36 by rear connecting plate 51 and a front connecting plate 52, as also shown in detail in FIGS. 1 and 2. These connecting plates provide a rigid frame member construction, such that any force tending to move rack 48 to the left, as viewed in FIG. 1 (for example by engagement of the teeth of member 34 with the teeth of rack 48), will be neutralized or counterbalanced by the engagement between the oppositely projecting teeth of the other outer rack 49 with the teeth of the other gear member 36. Thus, the respective racks 49 and 49 have a sort of guided or floating engagement with the gears (e.g. pinions) 34 and 36 and do not require frictional supporting engagement with the inner surfaces of the cylinder or housing wall 42. On the contrary, a definite spacing is provided between such racks and the housing, as stated, to provide the desired freedom of movement and floating support.

As further shown in FIGS. 1 and 2, the connecting plates or walls 51 and 52 are provided with appropriate vertical slots 53 to permit vertical reciprocating movement of the walls and associated rack members with piston 16, with respect to the supporting shafts 37 and 38 which extend outwardly beyond the respective connecting plates 51 and 52 into the cross beam supports 39 and 41 (FIG. 2). The housing wall 42 is further provided with appropriately located openings 54 in alignment with the pinion shafts 37 and 38, so that these shafts can be readily inserted or removed during assembly or disassembly of the interconnecting mechanism which includes the inner and outer racks and the interconnecting pinions 34 and 36, which serve as rotary interconnecting members.

As further shown in FIGS. 1 and 3, the piston 16 and its rack supports 46 and 47 are provided with extension plates 56 which taper downwardly and are provided with bearing openings for a wrist pin or cross shaft 57 carried by the slider member 58, which is illustrated in this embodiment as a cross head having respective sliding bearing surfaces 59 and 61 engaging the longitudinally extending inner guide surface portion of the housing wall 42. As shown in detail in FIG. 3, the slider includes a rear cross beam 62, and a corresponding front cross beam 63 which are spaced apart from each other to provide a cutaway portion or opening 64 in the slider, and thus provide a thinner and lighter wall portion 66 as part of the slider bearing surface. Within the opening or cutaway portion 64, the cross shaft 57 is not only pivotally connected to the extensions 56, but also serves as a part of the pivotal connection to a connecting rod 67. Thus a rotary or pivotal bearing portion 68 at one end of connecting rod 67 is carried on cross shaft 57 between the two extensions 56.

The other end of connecting rod 67 has a crank bearing portion 69 pivotally connected to a single throw crank portion 71 of a rotary drive shaft 72 extending transversely of the frame 12. Crankshaft 72 also has a counterbalancing portion 75, with its center of mass 180° apart from the crank portion 71. A drive shaft pulley 73 is engaged by a driving belt 74 driven by the driving pulley 76 of a rotary power source, such as an electric motor 77. Motor 77 has a pivotal support at 78 on frame 12 and an adjustable connection at 79 to a slotted adjusting arm 81 which is also pivoted at 82 to frame 12. Thus, by adjustment of the connection at 79, motor 77 may be fixed at slightly different positions with respect to supporting pivot 78, to secure the desired tension in the driving belt 74. A flywheel (not shown) is secured to shaft 72 in known manner.

Thus, the features of construction shown in FIGS. 1 to 3 provide a balanced, 2-chamber compressor, in which a connecting rod transmits power from a rotary driving shaft to a reciprocating slider member, and in which a preferred form of interconnecting mechanism includes guiding pinions 34 and 36, outer racks 48 and 49 and associated frame members connected to slider 58, and inner racks 32 and 33 connected to another movable member 14, which is thereby driven at all times in straight-line reciprocating movement in opposite directions to slider 58 and its associated parts. Members 14, 29, 30 and 31 serve as a counterbalancer member for the slider, with respective upper and lower piston members 14 and 16 associated with and moving longitudinally as a unit as parts of the respective counterbalancer member and slider member to provide two stages of compression. Since the upper compressor chamber 18 has only one moving piston face 14a, while the lower compressor chamber 17 has two oppositely moving piston faces 14b and 16a, it will be understood that the change in volume during compression in the lower chamber 17 is correspondingly greater than the change in volume of the upper chamber 18, and this relationship is particularly adapted to the provision of first and second stages of compression in the respective lower and upper chambers. Also, for a given degree of desired compression in the lower chamber 17, since both the upper and lower walls or faces of this chamber are moving in opposite directions toward and away from each other, it will be understood that the relative speed of movement of the respective pistons 14 and 16 can be substantially less than the required rate of movement of a single piston within a compressor chamber in which the opposite wall is fixed or stationary.

Another embodiment of the invention is shown in FIG. 4, which illustrates another type of situation. In this case compressor 86 includes a compressor cylinder 87 which is closed at the top by a cylinder head similar to that in FIG. 1 and is closed at the bottom by a fixed partition 88 having a central opening with a suitable sealing member 89 through which the piston rod 29 of piston 14 may move. Thus piston 14, and its upper and lower working faces 14a and 14b effectively divide the compressor cylinder into a first compressor chamber 91 and a second compressor chamber 92. In this case, compressor chamber 91 has an inlet 93 and an outlet 94, while the upper compressor chamber 92 has a corresponding inlet 96 and outlet 97. The reciprocating movement of piston 14 will alternately provide compression strokes which involve equal successive changes in volume in their respective lower and upper chambers, so that this embodiment of the invention is particularly adapted for use of the respective compressor chambers 91 and 92 as parallel sections of a single stage of compression.

The desired compression strokes for piston 14 are obtained by the same arrangement of driving mechanism shown in FIG. 1, except that in this case, the slider member 58 is connected to plates 51, 52 and 56, with outer racks 98 and 99, which engage supporting gears 34 and 36, but which do not include any piston portion associated with the slider 58. Thus the piston 14 and its associated parts, such as piston rod 29 and double rack 30, serve as a counterbalancer member moving at all times in opposite directions to the slider member 58 and its associated parts, including racks 98 and 99 and their interconnecting wall or frame members 51 and 52, which will correspond in all essential respects to the details of construction shown in FIG. 2.

In each of the devices of FIGS. 1 and 4, the rotary driving shaft 72 is provided with an appropriate counterweight 75 to counterbalance the mass of the eccentric crankshaft 71 and an appropriate portion of the mass of connecting rod 67. Another portion of the mass of connecting rod 67 can be considered as part of the mass moving in a straight line with slider member 58 and outer racks 48 and 49, and this total mass should then be counterbalanced longitudinally by an equal and oppositely moving mass for the counterbalancer member which includes the double rack 30 and connecting rod 29, with associated parts such as piston 14.

In each of the compressors of FIGS. 1 and 4, the balanced driving mechanism is adapted to counterbalance in appropriate fashion both the longitudinal and rotary components involved. The longitudinal components are particularly and precisely balanced by interconnecting and guiding slider member 58, the counterbalancer 29, and their respective associated parts for straight-line reciprocating movement at all times in respectively opposite directions. Furthermore, the respective masses associated with each of the slider and counterbalancer members are made equal to each other, taking into account an appropriate portion of the mass of the swinging connecting rod 67.

In effect, the total mass of the counterbalancer member and its associated parts, exceeds the total mass of the slider member, plus all its parts except the connecting rod, by an amount equal to only a portion of the connecting rod mass. Also, the effective mass of the counterbalancing portion, i.e. the effective off-center mass which is available to counterbalance the crank portion, exceeds the mass required to balance the mass of the crank portion by an amount equal to only a portion of the mass required to balance the total connecting rod mass. In an ideal case, the common center of mass of all parts of the piston machine and its driving mechanism should thus remain at essentially a fixed location along the longitudinal axis of movement of the slider and counterbalancer members. As a practical matter, however, some variation from the ideal may be acceptable, or even necessary, depending on the particular shape, dimensions and mass of the swinging connecting rod, for example.

In FIG. 5, another form of interconnecting mechanism is shown in a compressor assembly essentially similar in other respects to that shown in FIG. 1. In this case the interconnecting mechanism includes two rotary oscillating interconnecting members 101 and 102 in the specific form of levers, which are rotatably supported at intermediate points of the respective levers by the respective cross shafts 103 and 104. The outer end of lever 101 is connected by an outer connecting member 106, in the specific form of a link having one end pivoted at 107 to the outer end of lever 101 and its other end pivoted at 108 to the wall portion 46 of piston portion 16.

The inner end of lever 101 is symmetrically connected by an inner connecting member or link 111, which has one end pivoted at 109 to the inner end of lever 101 and its other end pivoted at 112 to an end portion 113 of the connecting shaft 29 which forms part of the counterbalancer member.

The second rotary interconnecting member 102 is similarly connected by an outer link 114 to the wall portion 47 of piston 16, and by an inner link 116 to the end portion 113 of shaft 29.

It is important to note that the outer connecting links 106 and 114 extend generally longitudinally in one direction from the oscillating rotary interconnecting levers 101 and 102 to one of the elements associated and moving longitudinally with the slider member 58, while the inner links 111 and 116 extend generally longitudinally in the opposite direction from the inner ends of the respective lever members 101 and 102 to the end 113 of the counterbalancer member. These links are parallel to each other and are equal in length in the example of FIG. 5, where the inner and outer arms of levers 101 and 102 are equal. These oppositely projecting links thus provide a sort of Z-shaped linkage in which all lateral swinging and rotary movements of the individual parts of the interconnecting mechanism can be fully balanced by corresponding parts within the interconnecting mechanism itself.

The multiple chamber compressor assembly shown in FIG. 4 is particularly advantageous in providing a "dry" compressor, in which the compressor piston and compressor chamber can be more effectively isolated from those working parts of the machine which require lubrication. Thus both the first and second compression chambers 91 and 92 of this embodiment are located along the vertical longitudinal axis of movement of the slider and counterbalancer members at a location beyond, and in this particular case above, the crankshaft, connecting rod, slider member, interconnecting mechanism, and even part of the counterbalancer member such as the inner rack portion 30 and at least part of the piston connecting shaft 29. End wall 88 of the compressor cylinder is located below the piston portion 14 and between it and the remaining elements described. The vertical orientation of the longitudinal axis of movement of the parts adds to the effectiveness of the isolation of the compression chambers.

The isolation in either the vertical or any other orientation of the machine can be further enhanced by the modified construction shown in FIG. 6. This modification involves the addition of a second intermediate wall 121 spaced below wall 88 and providing an intermediate space between the two walls, within which further isolating means can be provided to prevent contaminents from passing through walls 121 and 88 to the compression chamber. Wall 121 includes an opening for shaft 29, with a sealing member 123. One further isolating means is the provision of ventilating means for the space between the walls. Louvers or openings 124 in side wall 123 provide such ventilation, so fumes cannot pass directly up through wall 121 and then through wall 88. Another isolating means is the provision on shaft 29 of a slihger member 126, which is spaced below wall 88 and above wall 121 and prevents even traces of lubricant from the interconnecting mechanism from creeping upwardly along the upper portion of connecting shaft 29. Walls 88 and 121 must be spaced from each other a distance at least equal to the total longitudinal stroke of shaft 29.

The counterbalanced fixed stroke compressors, as described in the foregoing specification, are believed to offer advantages in flexibility of design and construction to meet the requirements of different applications. Two specific interconnecting mechanisms have been shown for insuring oppositely directed straight-line movement of the slider and counterbalancer members at all times. It will be understood that some variations are possible, provided the desired balance is obtained, without introducing undesired and unbalanced lateral, swinging or centrifugal forces.

These improved counterbalanced fixed stroke compressor features are particularly useful in the design of compressor assemblies with compression chambers, and with a compressor cylinder located at one end of the machine where there is maximum possibility of isolation of a compression chamber from the other working elements of the machine, and where there is a possibility of using standardized individual elements in some cases, such as available ranges of compressor cylinders and pistons and the like. The invention is particularly adaptable to the construction of compressors with vertically movable piston portions, in which the compressor assembly can be fully balanced and the requirement for large sizes and particularly for large and heavy supporting base portions can be substantially eliminated or reduced.

Such vertically oriented compressors have the further advantage that there is no wear along one side of the compressor cylinder due to the weight of the piston itself. The counterbalancing features, including both the oppositely and longitudinally movable counterbalancer and slider members and their interconnecting mechanism and the specific counterbalancing of the single-throw crankshaft provide compressors which, if compared to earlier compressors, for example, "L" type or "boxer" type compressors, do not have substantial unbalanced tilting forces and can operate at higher speeds, with less total wear, size, cost and floor space for a given application.

The foregoing specification accordingly sets forth some of the ways in which the invention may be practiced, including the best mode presently contemplated for carrying out the invention. Other modifications and variations may be apparent to those skilled in the art, in the light of the foregoing description and the following claims.

We claim:

1. A counterbalanced fixed stroke piston machine comprising a housing, a first movable member serving as a slider member supported for straight-line reciprocating movement in the housing with its center of gravity moving along a desired longitudinal axis thereof, a second movable member serving as a counterbalancer member also supported for straight-line reciprocating movement with its center of gravity moving along the same longitudinal axis, interconnecting mechanism connecting the slider and counterbalancer members for counterbalancing proportional straight-line movement of such members in opposite directions to each other along said axis at all times, a counterbalanced single-throw rotary crankshaft member extending generally crosswise with reference to said longitudinal axis and having a single-throw crank portion and a counterbalancing portion thereon, a connecting rod having one end pivotally connected to said crank portion and a second end pivotally connected to the slider member for transmission of desired forces from said rotary crankshaft member to the reciprocating slider member, at least a first piston portion, with at least one piston face, associated with and reciprocating longitudinally along said axis as a unit as at least part of one of the slider and counterbalancer members, said first piston portion being positioned along said longitudinal axis at a location beyond said crankshaft member and interconnecting mechanism, and said housing comprising a compressor cylinder portion having at least a first cylinder wall portion positioned along said longitudinal axis beyond said crankshaft member and interconnecting mechanism, said first piston portion reciprocating along said axis within said first cylinder wall portion, and said one piston face serving as a movable compressor piston face providing one movable end wall of at least a first compression chamber within the cylinder portion.

2. A counterbalanced fixed stroke compressor according to claim 1 having a plurality of piston portions each having at least one piston face serving as a movable compressor piston face, and in which all compressor piston portions of the compressor are associated with and move longitudinally as a unit with only one of the movable slider and counterbalancer members.

3. A counterbalanced fixed stroke compressor according to claim 2 in which all compressor piston portions of the compressor are associated with and move longitudinally as a unit with only the movable counterbalancer member.

4. A counterbalanced fixed stroke compressor according to claim 1 in which the mass of the second movable member, including all portions moving longitudinally as a unit therewith, exceeds the mass of the first movable member, including all portions other than the connecting rod moving longitudinally as a unit therewith, by an amount equal to only a portion of the total connecting rod mass, and in which the effective mass of the counterbalancing portion of the crankshaft exceeds the mass required to counterbalance only the single-throw crank portion by an amount equal to only a portion of the mass required to balance the total connecting rod mass.

5. A counterbalanced fixed stroke piston machine according to claim 1 in which the interconnecting mechanism has a symmetrical force transmitting and balancing arrangement which includes respective symmetrical force transmitting portions, each of the slider and counterbalancing members having a respective common connecting portion moving longitudinally with such member to which the corresponding symmetrical force transmitting portions of the interconnecting mechanism are connected and in which common connecting portion any transverse components of forces introduced by the interconnecting mechanism are balanced and constrained.

6. A counterbalanced fixed stroke compressor according to claim 5 in which said interconnecting mechanism includes at least first and second rotary interconnecting members rotatably supported for rotation on supporting axes extending crosswise of said longitudinal axis and spaced symmetrically from each other around and outwardly from said longitudinal axis, said rotary interconnecting members having inner and outer portions, symmetrically arranged outer connecting members providing a force-transmitting connection between the outer portion of each rotary interconnecting member and one of said first and second movable members, and symmetrically arranged inner connecting members providing a force-transmitting connection between the inner portion of each rotary interconnecting member and the other of said first and second movable members.

7. A counterbalanced fixed stroke compressor according to claim 6 in which said first and second rotary interconnecting members are levers each having an intermediate point supported for rotation on one of said crosswise supporting axes, and in which said outer connecting members are links pivoted to the outer ends of said levers and extending generally longitudinally in one direction therefrom to one of said first and second movable members, and in which said inner connecting members are links pivoted to the inner ends of said levers and extending generally longitudinally in the opposite direction therefrom to the other of said first and second movable members, and in which the inner and outer links are parallel to each other and their relative lengths are proportional to the corresponding distances between the axis of rotation of the intermediate point of each lever and the inner and outer points at which the respective inner and outer links are pivoted to each lever, the axes of all the pivotal connections to a given lever being parallel to each other and to the supporting axis at the intermediate point of that lever.

8. A counterbalanced fixed stroke compressor according to claim 6 in which said interconnecting mechanism includes at least two gear members rotatably supported for rotation on supporting axes extending crosswise of said longitudinal axis and spaced symmetrically from each other around and outwardly from said longitudinal axis, an inner rack portion reciprocating longitudinally as a unit as at least part of one of said first and second movable assemblies, said inner rack portion having a least two inner racks with teeth projecting outwardly away from each other and respectively engaging the corresponding gear members and guiding the inner rack portion for floating movement along said longitudinal axis between said gear members, and an outer rack portion having at least two outer racks reciprocating longitudinally as a unit as at least part of the other of said first and second movable assemblies, said outer racks being spaced outwardly from and parallel to the inner racks and having teeth projecting inwardly and respectively engaging the corresponding gear members, said outer rack portion including a frame member providing a common connecting portion moving as a unit with said outer racks and rigidly interconnecting said outer racks at a location close to said gear members and thereby guiding and supporting the outer racks on said gear members for floating movement along said longitudinal axis.

9. A counterbalanced fixed stroke compressor according to claim 5 in which the first piston portion is associated with and reciprocates longitudinally along said axis as a unit as at least part of the counterbalancer member, said interconnecting mechanism having a construction and arrangement transmitting driving forces from the crankshaft, connecting rod and slider member to the counterbalancer member and piston portion.

10. A counterbalanced fixed stroke compressor according to claim 9 having a second piston portion moving longitudinally as a unit as at least part of said slider member.

11. A counterbalanced fixed stroke compressor according to claim 10 having first and second piston faces on said first piston portion.

12. A counterbalanced fixed stroke compressor according to claim 1, said first cylinder wall portion having a transverse wall also spaced from and separating the first cylinder wall portion from said interconnecting mechanism and crankshaft member, and said piston portion having a connecting shaft projecting through said transverse wall and connected to one of said slider and counterbalancer members.

13. A counterbalanced fixed stroke compressor comprising a first movable member serving as a slider member, guide means supporting the slider member for straight-line reciprocating movement with its center of gravity moving along a desired vertical longitudinal axis, a second movable member serving as a counterbalancer member also supported for straight-line reciprocating movement with its center of gravity moving along the same longitudinal axis, interconnecting mechanism connecting the slider and counterbalancer members for counterbalancing straight-line movement of such members in opposite directions to each other along said axis at all times, a counterbalanced single-throw rotary crankshaft member extending generally crosswise with reference to said longitudinal axis and having a single-throw crank portion and a counterbalancing portion thereon, a connecting rod having one end pivotally connected to said crank portion and a second end pivotally connected to the slider member for transmission of desired forces from said rotary crankshaft member to the reciprocating slider member, at least a first piston portion, with at least one piston face, associated with and reciprocating longitudinally along said axis as a unit as at least part of the counterbalancer member, said first piston portion being positioned along said longitudinal axis at a location above said crankshaft member and interconnecting mechanism, and a compressor cylinder having at least a first cylinder wall portion positioned along said longitudinal axis above said crankshaft member and interconnecting mechanism, said first piston portion reciprocating along said axis within said first cylinder wall portion, and said one piston face serving as a movable compressor piston face providing one movable end wall of at least a first compression chamber within the cylinder, and spaced above the crankshaft member and interconnecting mechanism, said cylinder having a bottom wall also spaced above said interconnecting mechanism and crankshaft member, and said piston portion having a connecting shaft projecting downwardly through said bottom wall and connected below said bottom wall to one of said slider and counterbalancer members, said interconnecting mechanism having a construction and arrangement transmitting driving forces from the crankshaft, connecting rod and slider member to the counterbalancer member and piston portion, and said compressor having a second wall spaced below the cylinder bottom wall and also spaced above said interconnecting mechanism and crankshaft member, said connecting shaft also projecting downwardly through said second wall, said cylinder bottom wall and second wall each having a sealing member closely fitting said piston connecting shaft, and said piston connecting shaft having a slinger member between said bottom wall and second wall for preventing upward creeping of undesired contaminants along said shaft and into said cylinder.

14. A counterbalanced fixed stroke compressor comprising a first movable member serving as a slider member, guide means supporting the slider member for straight-line reciprocating movement with its center of gravity moving along a desired vertical longitudinal axis, a second movable member serving as a counterbalancer member also supported for straight-line reciprocating movement with its center of gravity moving along the same longitudinal axis, interconnecting mechanism connecting the slider and counterbalancer members of counterbalancing straight-line movement of such members in opposite directions to each other along said axis at all times, a counterbalanced single-throw rotary crankshaft member extending generally crosswise with reference to said longitudinal axis and having a single-throw crank portion and a counterbalancing portion thereon, a connecting rod having one end pivotally connected to said crank portion and a second end pivotally connected to the slider member for transmission of desired forces from said rotary crankshaft member to the reciprocating slider member, at least a first piston portion, with at least first and second piston faces, associated with and reciprocating longitudinally along said axis as a unit as at least part of one of the slider and counterbalancer members, said first piston portion being positioned along said longitudinal axis at a location above said crankshaft member and interconnecting mechanism, and a compressor cylinder having at least a first cylinder wall portion positioned along said longitudinal axis above said crankshaft member and interconnecting mechanism, said first piston portion reciprocating along said axis within said first cylinder wall portion, and said one piston face serving as a movable compressor piston face providing one movable end wall of at least a first compression chamber within the cylinder and spaced above the crankshaft member and interconnecting mechanisms, said cylinder having a bottom wall also spaced above said interconnecting mechanism and crankshaft member, and said piston portion having a connecting shaft projecting downwardly through said bottom wall and connected below said bottom wall to one of said slider and counterbalancer members, and in which said first piston portion divides said cylinder into first and second compression chambers respectively below and above said first piston portion.

15. A counterbalanced fixed stroke compressor according to claim 14 having a second piston portion associated with and reciprocating longitudinally along said axis as a unit as at least part of the slider assembly, said second piston portion and having an upper piston face defining a movable lower end wall for said second compression chamber.

16. A counterbalanced fixed stroke compressor comprising a first movable member serving as a slider member, guide means supporting the slider member for straight-line reciprocating movement with its center of gravity moving along a desired longitudinal axis, a second movable member serving as a counterbalancer member also supported for straight-line reciprocating movement with its center of gravity moving along the same longitudinal axis, interconnecting mechanism connecting the slider and counterbalancer members for counterbalancing straight-line movement of such members in opposite directions to each other along said axis at all times, a counterbalanced single-throw rotary crankshaft member extending generally crosswise with reference to said longitudinal axis and having a single-throw crank portion and a counterbalancing portion thereon, a connecting rod having one end pivotally connected to said crank portion and a second end pivotally connected to the slider member for transmission of desired forces from said rotary crankshaft member to the reciprocating slider member, at least a first piston portion, with at least one piston face, associated with and reciprocating longitudinally along said axis as a unit as at least part of one of the slider and counterbalancer members, said first piston portion being positioned along said longitudinal axis at a location beyond said crankshaft member and interconnecting mechanism, and a compressor cylinder having a first cylinder wall portion positioned along said longitudinal axis beyond said crankshaft member and interconnecting mechanism, said first piston portion reciprocating along said axis within said first cylinder wall portion, and said one piston face serving as a movable compressor piston face providing one movable end wall of at least a first compression chamber within the cylinder, said compressor also comprising a second cylinder wall portion with said first and second cylinder wall portions in coaxial alignment, with said longitudinal axis, and a second piston portion with a second piston face associated with and reciprocating longitudinally as a unit as at least part of one of the first and second movable members, the relative axial locations of the respective cylinder wall and piston portions and the particular movable member with which each piston and piston face moves as a unit providing at least a first compression chamber and a second compression chamber along said longitudinal axis beyond said crankshaft member and interconnecting mechanism.

17. A counterbalanced fixed stroke plural chamber compressor according to claim 16 in which the relative axial locations of the respective cylinder wall and piston portions, and the particular movable member with which each piston face moves as a unit, provide at least two compression chambers in one of which a compression stroke takes place during movement of the connecting rod generally longitudinally in one direction, and in the other of which a compression stroke takes place during movement of the connecting rod generally longitudinally in the opposite direction.

18. A counterbalanced fixed stroke plural chamber compressor according to claim 16 in which the two cylinder wall portions are longitudinally adjacent to each other and constitute parts of a common cylinder within which the first and second piston portions provide opposite ends of a common compression chamber and are connected respectively to the slider and counterbalancer members.

19. A plural chamber compressor according to claim 16 in which the machine has a body portion and said cylinder wall portions are at fixed locations on the body portion.

20. A plural chamber compressor according to claim 19 in which said guide means is part of one of the cylinder wall portions.

* * * * *